United States Patent

Minasyan et al.

[11] Patent Number: 5,886,060
[45] Date of Patent: Mar. 23, 1999

[54] METHOD FOR OBTAINING FOAMED ORGANOSILICON COMPOSITION

[75] Inventors: Ruben Mkrtichovich Minasyan, Moscow; Natalia Yur'evna Semenkova, Moskovskaya obl; Igor Anatol'evich Makarenko, Moscow; Spartak Timofeevich Belyaev, Moscow; Alexandr Nikolaevich Polivanov, Moscow; Natalia Mikhailovna Kozodaeva, Moscow; Marina Mikhailovna Kozodaeva, Moscow; Sergei Alexandrovich Perevozchikov, Moscow; Ivan Konstantinovich Shvetsov, Moscow, all of Russian Federation; Piter Gulko, Farm Heiven Draiv Rockvill, Md.

[73] Assignee: Obschestvennoe Ob'Edinente "Euro-Asian Physical Society", Russian Federation

[21] Appl. No.: 737,390

[22] PCT Filed: Jul. 16, 1996

[86] PCT No.: PCT/RU96/00193

§ 371 Date: Nov. 8, 1996

§ 102(e) Date: Nov. 8, 1996

[30] Foreign Application Priority Data

May 20, 1996 [RU] Russian Federation ............... 9610535

[51] Int. Cl.⁶ ...................................................... C08J 9/08
[52] U.S. Cl. ................................. 521/91; 521/92; 521/93; 521/122; 521/123; 521/124; 521/134; 521/154
[58] Field of Search ..................................... 521/134, 154, 521/91, 92, 93, 122, 123, 124

[56] References Cited

U.S. PATENT DOCUMENTS

| | | | |
|---|---|---|---|
| 3,539,530 | 11/1970 | Karstedt | 260/45.75 |
| 4,695,597 | 9/1987 | Sejno | 521/154 |
| 4,705,810 | 11/1987 | Millet | 521/86 |
| 4,987,155 | 1/1991 | Inoue | 521/77 |
| 5,216,037 | 6/1993 | Miyoshi | 521/8 |
| 5,238,967 | 8/1993 | Okawa | 521/77 |
| 5,356,940 | 10/1994 | Giesen | 521/77 |

FOREIGN PATENT DOCUMENTS

| | | |
|---|---|---|
| 2047158 | 2/1990 | Japan . |
| 309029 | 9/1971 | Russian Federation . |
| 338107 | 9/1975 | Russian Federation . |
| 015792 | 5/1996 | Russian Federation . |

OTHER PUBLICATIONS

High Polymer Compositions By Svernyi V.Y. et al Published 1988 vol. 30.

*Primary Examiner*—Morton Foelak
*Attorney, Agent, or Firm*—David L. Garrison; Matthew J. Marquardt

[57] ABSTRACT

Method for obtaining the foamed organosilicon compositions, involving mixing of organosiloxane rubber (OR), organosilicon joining (JA) and modifier (M). Agents acting like (OR) are represented by polyorganosiloxane block-copolymers having formula as follows: $\{[R^1SiO_{1.5}]_a [R^2(OH)SiO]_b, [R^3R^4SiO]_c\}_n$, where: $R^1R^2R^3R^4$ are aliphatic, aromatic radicals having from 1 to 6 atoms carbon; n is an integer from 30 to 360; c=1; a is selected from the 0.019–3.760 interval; b is selected from the 0.008–0.240 interval; or the mixture of the above block-copolymer with the "α", "ω"-dihydroxypolydiorganosiloxane in the ratio of (0.05–0.5): 1, respectively; while the individual compositions or mixtures of polyorganohydridesiloxanes act as (JA), having general formula as follows: $R_3SiO[R^1(H)SiO]_m—[R_2SiO]_nSiR_3$ or at least one substance from the compositions having general formula as follows: $RSiX_3$, where: R=alkyl radical having from 1 to 6 atoms carbon, $CH_2=CH—$, X: $—ON=C(CH_3)_2$, $—OC(O)—CH_3$, and amines are used as (M), having general formula as follows: $R^1R^2N—(CH_2)_n—Si(OR^3)_3$, or the mixture of sodium bicarbonate with zinc oxide, or non-organic compound of cobalt with 34% cobalt content, with the proviso of mass fraction ratio of (OR) mixed components as follows: (OR)=100; (JA)=from 2 to 15; (M)=from 2 to 22.

7 Claims, No Drawings

METHOD FOR OBTAINING FOAMED ORGANOSILICON COMPOSITION

This application is based on International Application PCT/RU96/00193, filed Jul. 16, 1996.

The present invention relates to the chemical technology, and in particular to the methods for obtaining the organosilicon compositions being foamed at the expense of gases liberated at chemical reactions of mixture components; the present invention may be used for production of elastomer foams having improved radiation resistance.

PRIOR AMOUNT

The methods for obtaining foamed organosilicon compositions are well known in the art (U.S. Pat. No. 5,238,967).

Such known methods involved obtaining foamed organosilicon compositions by means of mixing the polymer base, comprising the "α", "ω"-dihydroxypolydiorganoisiloxanes and foaming agents.

The organosilicon composites obtained by means of the known method are consolidated at room temperature, yet featuring insufficient mechanical strength and thermal resistance.

Such other methods for obtaining hi-strength thermal resistive elastomer materials on the basis of block-copolymers having linear/ladder structure (see High Molecular Compositions, V. XXX, #9, Moscow, 1988, pp. 1832–1836).

Yet the known amount of art does not comprise any data on usage of block-copolymers having linear/ladder structure as a polymer base of foamed organosilicon compositions.

The most close to the present invention is the method for obtaining the foamed organosilicon compositions, involving the mixing of organosiloxane rubber, organosilicon joining agent and modifier (JP, A, 2-47158).

The known prior method involves usage of: vinyl containing poly organosiloxane as a organosiloxane rubber; polyorganohydridesiloxane with 0.3%–1.6% contents of SiH groups as a joining agent; and compositions containing hydroxyl groups as a modifier.

The known method provides to obtain the foamed organosilicon compositions having improved strength capacity. Yet the material produced according to the known method have high gassing rating at radiation exposure.

It is the basis of the present invention to resolve a problem to produce light weight and strong organosilicon material resistive to the long-term radiation exposure.

The technical result of the present Invention lies in decrease of radiation gassing of foamed organosilicon compositions, obtained by means of mixing of organosiloxane rubber, organosilicon joining agent and modifier.

To the accomplishment of foregoing technical result and related ends the present Invention, then, consists in that in the method for production of foamed organosilicon compositions, involving the mixing of organosiloxane rubber; organosilicon joining agent and modifier, the polyorganosiloxane block-copolymers are used as organosiloxane rubber, having general formula as follows:

having respective OH groups content from 0.2% to 4.0% and the ratio of $R^3R^4SiO$ monomeric units to $R^1SiO_{1.5}$ falling within the range 0.850–10,000, correspondingly, where: $R^1R^2R^3R^4$ are aliphatic, aromatic radicals having from 1 to 6 atoms carbon; n is an integer from 30 to 360; c=1; a is selected from the 0.019–3.760 interval; b is selected from the 0.008–0.240 interval; or the mixture of the above block-copolymer with the "α", "ω"-dihydroxypolydiorganosiloxane in the ratio of (0.05–0.5); 1, respectively; while the individual compositions or mixtures of polyorganohydridesiloxanes act as organosilicon joining agent, having general formula as follows:

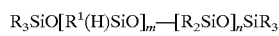

having the weight contents of SiH groups falling within the range (0.35–1.80)%; average numeric value of M molecular mass limited by 50–200, where: R, $R^1$ is the lowest alkyl radical having from 1 to 6 atoms carbon; m is an integer from 1 to 20; n is an integer from 0 to 19; (m+n) sum equals 20, or at least one substance from the compositions having general formula as follows:

where:
R=alkyl radical having from 1 to 6 atoms carbon, $CH_2=CH-$, X: $-OH=C(CH_3)_2$, $-OC(O)-CH_3$, and organosilicon amines are used as a modifier, having general formula as follows:

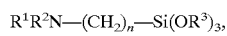

where:
$R^1=R^2=H-$, $CH_3-$, $C_2H_5-$, $R^3=CH_3-$, $C_2H_5-$; n is an integer from 0 to 3, or the mixture of sodium bicarbonate with zinc oxide, or non-organic compound of cobalt with 34% cobalt content,
with the proviso of mass fraction ratio of mixed components as follows:
organosiloxane rubber: 100
organosilicon joining agent: 2–15
modifier: 2–22.

Various modifications may be made in performance of the method, provided the reasonable efforts are taken as follows:
to additionally introduce in the composition tin diethyldicaprylate in amount from 0.3 to 1.5 parts;
to additionally introduce in the composition the filler in amount from 5 to 150 parts;
at least one of the substances acting as a filler might be used from the group as follows: chalk, silica filler, airseal, titan dioxide;
the glass micro-spheres were implemented as a filler.

The aforementioned alternative modifications are unified with single inventory idea, comprising realization of conditions providing to use the block-copolymers having linear/ladder structure on obtaining the radiation resistant foamed organosilicon compositions. In so doing, the block-copolymers of linear/ladder organosiloxanes are used either as polymer base, or as admixture to the linear polyorganosiloxanes.

The process of composition foaming and consolidation occurs at ambient temperature length all the modification variants. The time of foaming and forming of surface film amounts from 1.0 to 40 minutes. The full solidification of foams takes no more 48 hours.

Broadly stated, in accordance with the present Invention, the Method for Obtaining Foamed Organosilicon Compositions consists in the following.

While using under the present method such components as polyorganosiloxanes with silicol terminal groups; type $RSiX_3$ joining agent and in particular methyltris(acetoxi) silane; and the modifier in a form of mixed sodium bicarbonate with zinc oxide, the process of foaming and consolidation is determined by the following factors.

The acetic acid is evolving resulting from partial interaction of polymer silicol groups and joining agent acetoxi-groups. The acid causes sodium bicarbonate disintegration, proceeding with $CO_2$ liberation, thus foaming the composition. Disintegration process is catalyzed with zinc oxide.

Attainment of required rates of composition solidification is provided by means of consolidation catalyzers' introduction in a form of tin diethyldicaprylate. On adding such substance, under effect of ambient (air) humidity, the reversible reaction is established, featuring tin diethyldicaprylate hydrolysis followed by formation of hydroxyl derivative tin, in turn reacting with methyltris(acetoxi)silane, further creating the tin organosilicon composition and liberation of additional amount of acetic acid. The reaction of tin organosilicon composition with other silicol polymer groups results in formation of foam elastomer spatial structure.

While using under the present method such components, as polyorganohydridesiloxane as joining agent; and the modifier in a form of non-organic compound of cobalt (with 34% cobalt content), the composition foaming and consolidation is determined by the process as follows.

The polyorganohydridesiloxane/cobalt compound interaction causes formation of non-stable interim complex. Such complex reacting with polymer silicol groups is disintegrated with $CO_2$ liberation accompanied with formation of transverse joints. Complex ligand comprising Co atoms builds in the joint node. In such a way foaming occurs along with practically simultaneous forming of spatial structure.

Using the combination of joining of organosilicon amines (or mixture thereof), the composition foaming is proceeded as follows.

$H_2$ evolves further to the interaction between rubber silicol groups and joining agent hydride groups. The reaction runs simultaneously, involving hydride groups, belonging to various molecules of polyorganohydridesiloxanes, also accompanied by $H_2$ liberation.

Addition of organosilicon amines intensifies the foaming process by means of hydride groups interaction, belonging to various molecules of polyorganohydridesiloxanes.

Introduction of tin diethyldicaprylate in the composition catalyzes the silicol/hydride groups interaction, thus causing formation of foam elastomer spatial structure.

While using joining agents' combination in a form of at least one substance from the compositions having general formula $RSiX_3$ and the modifier in a form of non-organic compound of cobalt, the process of composition foaming and consolidation is performed by means of the following reactions.

Either acetic acid, or acetoxime is evolving resulting from partial interaction of rubber silicol groups and joining agent acetoxi- or acetoxime groups. Non-organic compound of cobalt featuring expressly alkaline character is disintegrated affected by acetic acid or acetoxime with $CO_2$ liberation.

Further polymer joining process is going on similarly to the above mentioned process involving mixed sodium bicarbonate and zinc oxide.

The objects and advantages of the present invention will become more fully apparent from the following description in which the alternative embodiment is set forth in details along with radiation test data. Component content is given in mass fractions.

ALTERNATIVE EMBODIMENTS OF THE PRESENT INVENTION

Embodiment #1

Further to the prototype methods, the composition is prepared in the mixer of mechanical mortar type, by means of mixing during 50–60 minutes of 100 parts of "α", "ω"-dihydroxypolydimethylsiloxane having general formula as follows:

$H[(OSi(CH_3)_2]_n OH$, having 160 P viscosity at 20° C. (M=35,000), 20 parts of polydimethylsiloxane with silicol groups and 80 cPa viscosity at 20° C. and 10 parts of polymethylhydridesiloxane having terminal trimethylsiloxi-groups (0.2 P viscosity at 20° C.).

The obtained mixture is added with 4 parts of tin octoate, re-mixing the composition during 1–3 minutes.

The composition is foamed at room temperature for 5 minutes.

Embodiment #2

Further to the above method being the closest prototype and according to the procedure described in the above Embodiment #1, the composition is prepared by means of mixing 100 parts of vinyl containing polyorganosiloxane having general formula as follows:

having 200 P viscosity at 25° C., 10 parts of polyorganohydridesiloxane containing $\geq 2$ SiH groups having 0.1 P viscosity at 25° C., 50 parts of oligoorganoalcosiloxane of ramified structure having general formula as follows:

where n=8–10, and respective ratio of $[(CH_3)_3SiO_{0.5}]$ and $[SiO_2]$ units amounts 0.85; M of oligomethylsiloxane equals 2,000; oligomer comprises 1.8%–2.0% $C_2H_2O$— groups and 1.7% —OH groups; 0.2 parts of water, etc. OH containing composition.

The produced mixture is supplied with introduced 0.01 part of 2% $H_2PtCl_6$ solution, further re-mixing it during 3–4 minutes.

Composition obtained is foamed during 10 minutes, further consolidating during 24 hours at room temperature.

Embodiment #3

Further to the above procedure described in the above Embodiment #1, the composition is prepared by means of mixing 100 parts of "α", "ω"-dihydroxypolydimethylsiloxane, having 24 P viscosity at 20° C. (M=5,300), 10 parts of zinc oxide and 10 parts of sodium bicarbonate.

The produced mixture is injected with 5 parts of methyltris(acetoxi)silane having the formula $CH_3Si(OC(O)CH_3)_3$, and the composition is re-mixed for 3–4 minutes. The mass obtained is added with 0.8 parts tin diethyldicaprylate further re-mixing the composition for 1–2 minutes.

Composition obtained is foamed, consolidating for 10 minutes in the open air.

Embodiment #4

Further to the above procedure described in the above Embodiment #1, the composition is prepared by means of mixing 100 parts of "α", "ω"-dihydroxypolydimethylsiloxane, having 160 P viscosity at 20° C.; 8 parts silica filler, 5 parts airsil, 10 parts of zinc oxide and 5 parts of sodium bicarbonate. The produced mixture is injected with 3 parts of methyltris(acetoxi)silane having the formula $CH_3Si(OC(O)CH_3)_3$, and the composition is re-mixed for 1–2 minutes. The mass obtained is added with 0.8 parts tin diethyldicaprylate further additionally re-mixing the composition for 1–2 minutes.

Composition obtained is foamed, consolidating for 20 minutes in the open air.

Embodiment #5

Further to the above procedure described in the above Embodiment #1, the composition is prepared by means of mixing 100 parts of "α", "ω"-dihydroxypolydimethylsiloxane, having 160 P viscosity at 20° C. (M=35,000); 100 parts chalk; 50 parts oligoorganoalcosiloxane of ramified structure having general formula as follows:

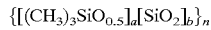

where n=10, and respective ratio of $[(CH_3)_3SiO_{0.5}]$ and $[SiO_2]$ units amounts 0.95.

Oligomer comprises 1.8% —$CH_2H_5O$— groups and 1.7% —OH groups.

3 parts polyorganohydridesiloxane having 0.15 P viscosity at 20° C. general formula as follows:

$(CH_3)_3SiO[CH_3(H)SiO]_mSi(CH_3)_3$, where m=20, n=0

The produced mixture is injected with 6 parts of γ-aminopropyltriethoxysilane having the formula $H_2N—(CH_2)_3—Si(OC_2H_5)$, and compound is further re-mixed for 3–4 minutes. The mass obtained is added with 0.9 parts tin diethyldicaprylate further additionally re-mixing the composition for 1–2 minutes.

Composition obtained is foamed for 25 minutes, further consolidating for 24 hours in the open air.

Embodiment #6

Further to the above procedure described in the above Embodiment #1, the composition is prepared by means of mixing 100 parts of "α", "ω"-dihydroxypolydimethylsiloxane, having 160 P viscosity at 20° C. (M=35,000); 100 parts chalk; 50 parts polyorganosiloxane block-copolymer having units as follows:

$(R^1SiO_{1.5}), R^2(OH)SiO, R^3R^4SiO,$ having general formula as follows: $\{[R^1SiO_{1.5}]_a[R^2(OH)SiO]_b, [R^3R^4SiO]_c\}_n$, where:
$R^1=R^2=C_6H_5—$, $R^3=R^4=CH_3—$, having 2.7% OH group contents and 12.6 P viscosity at 20° C.

5 parts polyorganohydridesiloxane having 0.15 P viscosity at 20° C. general formula as follows:

$(CH_3)_3SiO[CH_3(H)SiO]_m—[(CH_3)_2SiO]_nSi(CH_3)_3$

The produced mixture is injected with 2 parts of diethylaminomethyltriacetoxisilane having the formula $(C_2H_5)_2N—CH_2Si(OC_2H_5)_3$ and compound is further re-mixed for 3–4 minutes. The mass obtained is added with 0.6 parts tin diethyldicaprylate further additionally re-mixing the composition for 1–2 minutes.

Composition obtained is foamed for 25 minutes, further consolidating for 24 hours in the open air.

Embodiment #7

Further to the above procedure described in the above Embodiment #1, the composition is prepared by means of mixing 100 parts of "α", "ω"-dihydroxypolydimethylsiloxane, having 160 P viscosity at 20° C. (M=35,000); 100 parts chalk; 50 parts polyorganosiloxane block-copolymer having the aforementioned general formula and the units as follows:

$(R^1SiO_{1.5})$, $R^2(OH)SiO$, $R^3R^4SiO$, where: a=0.3; b=0.05; c=1; n=70; $R^1=R^2=C_6H_5—$, $R^3=R^4=CH_3—$, having 2.7% OH group contents and 12.6 P viscosity at 20° C.;

10 parts of zinc oxide and 10 parts of sodium bicarbonate.

The produced mixture is injected with 5 parts of methyltris(acetoxi)silane having the formula $CH_3Si(OC(O)CH_3)_3$, and the composition is re-mixed for 3–4 minutes.

The mass obtained is added with 0.6 parts tin diethyldicaprylate further additionally re-mixing the composition for 1–2 minutes.

Composition obtained is foamed for 25 minutes, further consolidating for 24 hours in the open air.

Embodiment #8

Further to the above procedure described in the above Embodiment #1, the composition is prepared by means of mixing for 40 minutes 100 parts of block-copolymer having the aforementioned general formula and the units as follows:

$(R^1SiO_{1.5})$ (1), $R^2(OH) SiO$ (2), $R^3R^4SiO$ (3), where: a=0.360–0.800; b=0.036–0.064; c=1; n=100–250;

$R^1=R^2=C_6H_5—$, $R^3=R^4=CH_3—$, having various ratio between units (3):(1)=0.80–2.600, respectively and having various contents of OH-groups in the range 0.30%–3.77% and various intrinsic viscosity of 0.15–0.6 dl/g.

Block-copolymers are used in a form of 45%–60% solutions in the toluene, esters or such other aromatic solvents. Calculus of all composition components is performed per 100 parts of dry block-copolymer.

100 parts titan dioxide;

10 parts polyorganohydridesiloxane having 0.2 P viscosity at 20° C. general formula as follows: $(CH_3)_3SiO[C_2H_5(H)SiO]_mSi(CH)_3$, where m=20, n=0.

The produced mixture is injected with 3 parts of γ-aminopropyltriethoxysilane having the formula $H_2N—(CH_2)_3—Si(OC_2H_5)_3$, and compound is further re-mixed for 3–4 minutes.

The mass obtained is added with 0.9 parts tin diethyldicaprylate further additionally re-mixing the composition for 1–2 minutes.

Composition obtained is foamed for 20 minutes, further consolidating for 24 hours in the open air.

Embodiment #9

Further to the above procedure described in the above Embodiment #1, the composition is prepared by means of mixing for 40 minutes 100 parts of block-copolymer having the aforementioned general formula and the units as follows:

$R^1=R^2=C_6H_5—$, $R^3=R^4=CH_3—$, having various ratio between units (3):(1)=0.80–2.600, respectively and having various contents of OH-groups in the range 0.30%–3.77% and various intrinsic viscosity of 0.15–0.6 dl/g.

Block-copolymers are used in a form of 45%–60% solutions in the toluene, esters or such other aromatic solvents. Calculus of all composition components is performed per 100 parts of dry block-copolymer.

100 parts titan dioxide;

10 parts of zinc oxide and 10 parts of sodium bicarbonate.

The produced mixture is injected with 4 parts of methyltris(acetoxi)silane having the formula $CH_3Si(OC(O)CH_3)_3$, and compound is further re-mixed for 3–4 minutes.

The mass obtained is added with 0.9 parts tin diethyldicaprylate further additionally re-mixing the composition for 1–2 minutes.

Composition obtained is foamed for 20 minutes, further consolidating for 24 hours in the open air.

Embodiment #10

Further to the above procedure described in the above Embodiment #1, the composition is prepared by means of mixing minutes 100 parts of block-copolymer having the aforementioned general formula and the units as follows:

$(R^1SiO_{1.5})$ (1), $R^2(OH)$ SiO (2), $R^3R^4SiO$ (3), where: a=0.175–0.42; b=0.030–0.060; c=1; n=40–250;

$R^1=R^2=C_6H_5—$, $—R^3=CH_3—$, $R^4=C_6H_5—$, having various ratio between units (3):(1)=2.300–3,2800, respectively and having various contents of OH-groups in the range 0.25%–0.86% and various intrinsic viscosity of 0.2–0.4 dl/g.

Block-copolymers are used in a form of 50%–60% solutions in the toluene, esters or such other aromatic solvents. Calculus of all composition components is performed per 100 parts of dry block-copolymer.

150 parts chalk; 10 parts polyorganohydridesiloxane having 0.15 P viscosity at 20° C. general formula as follows: $(CH_3)_3SiO[CH_3(H)SiO]_mSi(CH_3)_3$, where m=20, n=0.

The procedure mixture is injected with 3 parts of γ-aminopropyltriethoxysilane having the formula $H_2N—(CH_2)_3—Si(OC_2H_5)_3$, and compound is further re-mixed for 3–4 minutes.

The mass obtained is added with 0.8 parts tin diethyldicaprylate further additionally re-mixing the composition for 1–2 minutes.

Composition obtained is foamed for 25 minutes, further consolidating for 24 hours in the open air.

Embodiment #11

Further to the above procedure described in the above Embodiment #1, the composition is prepared by means of mixing minutes 100 parts of block-copolymer having the aforementioned general formula and the units as follows:

$(R^1SiO_{1.5})$ (1), $R^2(OH)$ SiO (2), $R^3R^4SiO$ (3), where: a=0.170–0.260; b=0.060–0.080; c=1; n=50–60;

$R^1=R^2=C_6H_5—$, $R^3=R^4=C_6H_5—$, having various ratio between units (3):(1)=2.300–3,2800, respectively and having various contents of OH-groups in the range 0.25%–0.86% and various intrinsic viscosity of 0.2–0.4 dl/g.

Block-copolymers are used in a form of 50%–60% solutions in the toluene, esters or such other aromatic solvents. Calculus of all composition components is performed per 100 parts of dry block-copolymer.

150 parts chalk; 10 parts of zinc oxide and 10 parts of sodium bicarbonate.

The produced mixture is injected with 2 parts of methyltris(acetoxi)silane having the formula $CH_3Si(OC(O)CH_3)_3$, and compound is further re-mixed for 3–4 minutes.

The mass obtained is added with 0.8 parts tin diethyldicaprylate further additionally re-mixing the composition for 1–2 minutes.

Composition obtained is foamed for 25 minutes, further consolidating for 24 hours in the open air.

Embodiment #12

Further to the above procedure described in the above Embodiment #1, the composition is prepared by means of mixing minutes 100 parts of polyorganosiloxane block-copolymer having the aforementioned general formula and the units as follows:

$(R^1SiO_{1.5})$ (1), $R^2(OH)$ SiO (2), $R^3R^4SiO$ (3), where: a=0.200; b=0.086; c=1; n=70;

$R^1=R^2=C_6H_5—$, $R^3=R^4=CH_3—$, having 2.7% OH group contents and 11.5 P viscosity, 150 parts chalk; 10 parts polyorganohydridesiloxane having 0.15 P viscosity at 20° C. general formula as follows: $(CH_3)_3SiO[CH_3(H)SiO]_m—[(CH_3)_2SiO]_nSi(CH_3)_3$, where m=7, n=13.

The produced mixture is injected with 12 parts non-organic composition of cobalt (with 34% cobalt content) and compound is further re-mixed for 1–2 minutes.

Composition obtained is foamed for 25 minutes, further consolidating for 24 hours in the open air.

Embodiment #13

Further to the above procedure described in the above Embodiment #1, the composition is prepared by means of mixing minutes 100 parts of polyorganosiloxane block-copolymer having the aforementioned general formula and the units as follows:

$(R^1SiO_{1.5})$ (1), $R^2(OH)$ SiO (2), $R^3R^4SiO$ (3), where: a=0.200; b=0.086; c=1; n=70;

$R^1=R^2=C_6H_5—$, $R^3=R^4=CH_3—$, having 2.7% OH group contents and 11.5 P viscosity, 150 parts chalk; 2 parts methyltris(acetoxi)silane having the formula $CH_3Si(ON=C(CH_3)_2)_3$.

The produced mixture is injected with 12 parts non-organic composition of cobalt (with 34% cobalt content) and compound is further re-mixed for 1–2 minutes.

Composition obtained is foamed for 25 minutes, further consolidating for 24 hours in the open air.

Embodiment #14

Further to the above procedure described in the above Embodiment #1, the composition is prepared by means of mixing minutes 100 parts of polyorganosiloxane block-copolymer having the aforementioned general formula and the units as follows:

$(R^1SiO_{1.5})$ (1), $R^2(OH)$ SiO (2), $R^3R^4SiO$ (3), where: a=0.200; b=0.086; c=1; n=70;

$R^1=R^2=C_6H_5—$, $R^3=R^4=CH_3—$, having 3% OH group contents and 13.0 P viscosity, 150 parts chalk; 10 parts polyorganohydridesiloxane having 0.2 P viscosity at 20° C. general formula as follows:

$(CH_3)_3SiO[CH_3(H)SiO]_m—[(CH_3)_2SiO]_nSi(CH_3)_3$, where m=6, n=14.

The produced mixture is injected with 12 parts non-organic composition of cobalt (with 34% cobalt content) and compound is further re-mixed for 1–2 minutes.

Compositions obtained is foamed for 30 minutes, further consolidating for maximum 48 hours in the open air.

Embodiment #15

Further to the above procedure described in the above Embodiment #1, the composition is prepared by means of mixing minutes 100 parts of polyorganosiloxane block-copolymer having the aforementioned general formula and the units as follows:

($R^1SiO_{1.5}$) (1), $R^2$(OH) SiO (2), $R^3R^4$SiO (3), where: a=0.200; b=0.086; c=1; n=70;

$R^1=R^2=C_6H_5-$, $R^3=R^4=CH_3-$, having 3% OH group contents and 13.0 P viscosity, 150 parts chalk; 2 parts vinyltris(acetoximo)silane having the general formula:

$CH_2=CHSi(ON=C(CH_3)_2)_3$.

The produced mixture is injected with 12 parts non-organic composition of cobalt (with 34% cobalt content) and compound is further consolidating for maximum 48 hours in the open air.

Embodiment #16

Further to the above procedure described in the above Embodiment #1, the composition is prepared by means of mixing minutes 100 parts of polyorganosiloxane block-copolymer having the aforementioned general formula and the units as follows:

($R^1SiO_{1.5}$) (1), $R^2$(OH) SiO (2), $R^3R^4$SiO (3), where: a=0.200; b=0.086; c=1; n=70;

$R^1=R^2=C_6H_5-$, $R^3=R^4CH_3-$, having 2.7% OH group contents and 10.0 P viscosity, 100 parts chalk; 10 parts polyorganohydridesiloxane having 0.15 P viscosity at 20° C. general formula as follows:

$(CH_3)_3SiO[CH_3(H)SiO]_m-[(CH_3)_2SiO]_nSi(CH_3)_3$, where M=7, n=13.

The produced mixture is injected with 20 parts non-organic composition of cobalt (with 34% cobalt content) and compound is further re-mixed for 1–2 minutes.

Composition obtained is foamed for 15–18 minutes, further consolidating for 24 hours in the open air.

Embodiment #17

Further to the above procedure described in the above Embodiment #1, the composition is prepared by means of mixing minutes 100 parts of polyorganosiloxane block-copolymer having the aforementioned general formula and the units as follows:

($R^1SiO_{1.5}$) (1), $R^2$(OH) SiO (2), $R^3R^4$SiO (3), where: a=0.200; b=0.086; c=1; n=70;

$R^1=R^2=C_6H_5-$, $R^3=R^4=CH_3-$, having 2.7% OH group contents and 10.0 P viscosity, 100 parts chalk; 2 parts methyltris(acetoximo)silane having the general formula: $CH_3Si(ON=C(CH_3)_2)_3$, 0.8 parts γ-aminopropyltriethoxysilane having the formula $H_2N-(CH_2)_3-Si(OC_2H_5)_3$, The produced mixture is injected with 20 parts non-organic composition of cobalt (with 34% cobalt content) and compound is further re-mixed for 1–2 minutes.

Composition obtained is foamed for 15–18 minutes, further consolidating for 24 hours in the open air.

Embodiment #18

Further to the above procedure described in the above Embodiment #1, the composition is prepared by means of mixing minutes 100 parts of polyorganosiloxane block-copolymer having the aforementioned general formula and the units as follows:

($R^1SiO_{1.5}$) (1), $R^2$(OH) SiO (2), $R^3R^4$SiO (3), where: a=0.200; b=0.086; c=1; n=70;

$R^1=R^2=C_6H_5-$, $R^3=R^4=CH_3-$, having 4% OH group contents and 11.0 P viscosity, 100 parts chalk; 50 parts glass micro-spheres; 10 parts polyorganohydridesiloxane having 0.15 P viscosity at 20° C. general formula as follows:

$(CH_3)_3SiO[CH_3(H)SiO]_m-[(CH_3)_2SiO]_nSi(CH_3)_3$, where m=7, n=13.

The produced mixture is injected with 12 parts non-organic composition of cobalt (with 34% cobalt content) and compound is further re-mixed for 1–2 minutes.

Composition obtained is foamed for 12–15 minutes, further consolidating for 24 hours in the open air.

Embodiment #19

Further to the above procedure described in the above Embodiment #1, the composition is prepared by means of mixing minutes 100 parts of polyorganosiloxane block-copolymer having the aforementioned general formula and the units as follows:

($R^1SiO_{1.5}$) (1), $R^2$(OH) SiO (2), $R^3R^4$SiO (3), where: a=0.200; b=0.086; c=1; n=70;

$R^1=R^2=C_6H_5-$, $R^3=R^4=CH_3-$, having 4% OH group contents and 11.0 P viscosity, 100 parts chalk; 50 parts glass micro-spheres; 2 parts methyltris(acetoxi)silane having the formula $CH_3Si(OC(O)CH_3)_3$.

The produced mixture is injected with 12 parts non-organic composition of cobalt (with 34% cobalt content) and compound is further re-mixed for 1–2 minutes.

Composition obtained is foamed for 12–15 minutes, further consolidating for 24 hours in the open air.

Embodiment #20

Further to the above procedure described in the above Embodiment #1, the composition is prepared by means of mixing minutes 100 parts of polyorganosiloxane block-copolymer having the aforementioned general formula and the units as follows:

($R^1SiO_{1.5}$) (1), $R^2$(OH) SiO (2), $R^3R^4$SiO (3), where: a=0.200; b=0.086; c=1; n=70;

$R^1=R^2=C_6H_5-$, $R^3=R^4=CH_3-$, having 2.7% OH group contents and 11.0 P viscosity, 50 parts chalk; 50 parts glass micro-spheres; 10 parts polyorganohydridesiloxane having 0.15 P viscosity at 20° C. general formula as follows:

$(CH_3)_3SiO[CH_3(H)SiO]_m-[(CH_3)_2SiO]_nSi(CH_3)_3$, where m=7, n=13.

The produced mixture is injected with 20 parts non-organic composition of cobalt (with 34% cobalt content) and compound is further re-mixed for 1–2 minutes.

Composition obtained is foamed for 12–15 minutes, further consolidating for 24 hours in the open air.

Embodiment #21

Further to the above procedure described in the above Embodiment #1, the composition is prepared by means of mixing minutes 100 parts of polyorganosiloxane block-copolymer having the aforementioned general formula and the units as follows:

$(R^1SiO_{1.5})$ (1), $R^2(OH)SiO$ (2), $R^3R^4SiO$ (3), where: a=0.200; b=0.086; c=1; n=70;

$R^1=R^2=C_6H_5—$, $R^3=R^4=CH_3—$, having 2.7% OH group contents and 11.0 P viscosity, 50 parts chalk; 50 parts glass micro-spheres; 2 parts vinyltris(acetoximo)silane having the general formula:

$$CH_2=CHSi(ON=C(CH_3)_2)_3.$$

The produced mixture is injected with 20 parts non-organic composition of cobalt (with 34% cobalt content) and compound is further re-mixed for 1–2 minutes.

Composition obtained is foamed for 12–15 minutes, further consolidating for 24 hours in the open air.

Radiation resistance parameters have been calculated for all foam elastomers. Radiation resistance has been assessed per value of gas released from foam elastomer sample, exposed by γ-radiation during 50, 100 and 150 hours, respectively. Dose capacity amounted 543 Rps. Data collected are represented by the table below. It is worth mentioning that compositions ##1 and 2 represented by the Embodiments 1 and 2, have been obtained further prototype patents.

The collected data witness that usage in the present Invention of ramified polyorganosiloxanes as organosiloxane rubbers performed either combined with linear polysiloxanes (see compositions 5–7), or independently (see compositions 8–21), provides sufficiently enhance radiation resistance of obtained foam elastomers. E.g. migrating from compositions 1–4 obtained at pure linear polyorganosiloxanes to the compositions 5–7 combining both linear; and ramified polymer structures, we may manage to significantly cut (10 times down) the value of gas release of samples produced, i.e. from 0.0909 kg/sq. cm/g for composition #1 to 0.0092 kg/sq. cm/g for composition #7; such value falls down practically negligent values for compositions ##12 and 13 while using the block-copolymers of linear/ladder structure.

TABLE

| Embodiment Number | Foam Material Density | Value of radiation gas release, kg/sq. cm/g at dose capacity of 543 Rps (or 1.96 Mrad per hour) Holding Time, hours | | |
|---|---|---|---|---|
| ## | g/cu. cm | 50 | 100 | 150 |
| 1. | .17 | .0909 | — | — |
| 2. | .12 | .0674 | — | — |
| 3. | .11 | .0375 | .0742 | — |
| 4. | .24 | .0238 | .0472 | .0721 |
| 5. | .40 | .0156 | .0320 | — |
| 6. | .50 | .0092 | .0236 | .0366 |
| 7. | .50 | .0092 | .0236 | .0366 |
| 8. | .70 | .0090–.0092 | .0190–.0198 | — |
| 9. | .70 | .0090–.0092 | .0190–.0198 | — |
| 10. | .65 | .0110–.0119 | .0170–.0198 | — |
| 11. | .65 | .0110–.0119 | .0170–.0177 | — |
| 12. | .56–.70 | 0 | 0 | .0002 |
| 13. | .56–.70 | 0 | 0 | .0002 |
| 14. | .5 | .0006 | .0044 | .0286 |
| 15. | .5 | .0006 | .0044 | .0286 |
| 16. | .4–.45 | .0118 | .0174 | .0341 |
| 17. | .4–.45 | .0118 | .0174 | .0341 |
| 18. | .48 | .0017 | .0115 | .0201 |
| 19. | .48 | .0017 | .0115 | .0201 |
| 20. | .37 | | | |
| 21. | .37 | | | |

INDUSTRIAL USE

The present invention may be most successfully used for production of elastomer foam materials having improved radiation resistance.

We claim:

1. Method for obtaining the foamed organosilicon compositions, involving mixing of organosiloxane rubber, organosilicon joining agent and modifier, characterizing in that agents acting like organosiloxane rubber represented by polyorganosiloxane block-copolymers having general formula as follows:

$$\{[R^1SiO_{1.5}]_a[R^2(OH)SiO]_b, [R^3R^4SiO]_c\}_n,$$

having respective OH groups content from 0.2% to 4.0% and the ratio of $R^3R^4SiO$ monomeric units to $R^1SiO_{1.5}$ falling within the range 0.850–10,000, correspondingly, where: $R^1R^2R^3R^4$ are aliphatic, aromatic radicals having from 1 to 6 atoms carbon; n is an integer from 30 to 360; c=1; a is selected from the 0.019–3.760 interval; b is selected from the 0.008–0.240 interval; or the mixture of the above block-copolymer with the "α", "ω"-dihydroxypolydiorganosiloxane in the ratio of (0.05–0.5); 1, respectively; while the individual compositions or mixtures of polyorganohydridesiloxanes act as organosilicon joining agent, having general formula as follows:

$$R_3SiO[R^1(H)SiO]_m—[R_2SiO]_nSiR_3$$

having the weight contents of SiH groups falling within the range (0.35–1.80)%; average numeric value of M molecular mass limited by 50–200, where: R, $R^1$ is the lowest alkyl radical having from 1 to 6 atoms carbon; m is an integer from 1 to 20; n is an integer from 0 to 19; (m+n) sum equals 20, or at least one substance from the compositions having general formula as follows:

$$RSiX_3,$$

where:

R=alkyl radical having from 1 to 6 atoms carbon, $CH_2=CH—$, X: $—OH=C(CH_3)_2$, $—OC(O)—CH_3$, and organosilicon amines are used as a modifier, having general formula as follows:

$$R^1R^2N—(CH_2)_n—Si(OR^3)_3,$$

where:

$R^1=R^2=H-$, $CH_3-$, $C_2H_5-$, $R^3=CH_3-$, $C_2H_5-$; n is an integer from 0 to 3, or the mixture of sodium bicarbonate with zinc oxide, or non-organic compound of cobalt with 34% cobalt content, with the proviso of mass fraction ratio of mixed components as follows:

organosiloxane rubber: 100
organosilicon joining agent: 2–15
modifier: 2–22.

2. Method according to the claim 1 above, characterizing in that the composition is additionally injected with tin diethyldicaprylate in amount from 0.3 to 1.5 parts.

3. Method according to the claim 1 above, characterizing in that the composition is additionally injected with filler in amount from 5 to 150 parts.

4. Method according to claim 1, characterizing in that at least one of the substances acting as a filler might be used from the group as follows: chalk, silica filler, airseal, titan dioxide.

5. Method according to claim 3, characterizing in that at least one of the substances acting as a filler might be used from the group as follows: chalk, silica filler, airseal, titan dioxide.

6. Method according to claim 1, characterizing in that glass micro-spheres are implemented as a filler.

7. Method according to claim 3, characterizing in that glass micro-spheres are implemented as a filler.

* * * * *

UNITED STATES PATENT AND TRADEMARK OFFICE
CERTIFICATE OF CORRECTION

PATENT NO. : 5,886,060
DATED : March 23, 1999
INVENTOR(S) : Ruben M. Minasyan et al.

It is certified that error appears in the above-indentified patent and that said Letters Patent is hereby corrected as shown below:

Claim 1, at column 12, line 60, delete "OH", and insert therefor --ON--.

Claim 2, at column 13, line 10, delete "the".

Claim 3, at column 13, line 13, delete "the".

Claim 4, at column 14, line 2, delete "might be", and insert therefor --is--.

Claim 4, at column 14, line 3, delete "titan", and insert therefor --titanium--.

Claim 5, at column 14, line 6, delete "might be", and insert therefor --is--.

Claim 5, at column 14, line 7, delete "titan", and insert therefor --titanium.

Signed and Sealed this

Tenth Day of August, 1999

Q. TODD DICKINSON

*Attest:*

*Attesting Officer*

Acting Commissioner of Patents and Trademarks